United States Patent [19]
Haraguchi

[11] Patent Number: 5,974,217
[45] Date of Patent: *Oct. 26, 1999

[54] INFORMATION TRANSMISSION SYSTEM HAVING A REDUCED NUMBER OF STORED PROGRAMS AND RECORDING MEDIA PLAYBACK DRIVES

[75] Inventor: Hideo Haraguchi, Kanagawa, Japan

[73] Assignee: Sony Corporation, Tokyo, Japan

[*] Notice: This patent is subject to a terminal disclaimer.

[21] Appl. No.: 08/932,074

[22] Filed: Sep. 17, 1997

Related U.S. Application Data

[63] Continuation of application No. 08/774,899, Dec. 27, 1996, Pat. No. 5,721,803, which is a continuation of application No. 08/280,353, Jul. 26, 1994, abandoned.

[30] Foreign Application Priority Data

Jul. 26, 1993 [JP] Japan .................................. 5-183977
Jul. 7, 1994 [JP] Japan .................................. 6-156163

[51] Int. Cl.$^6$ .............................. H04N 9/89; H04N 5/91; H04N 7/10; H04N 7/14
[52] U.S. Cl. .................................. 386/15; 348/7; 348/13
[58] Field of Search .................................. 386/15, 70, 1, 386/33, 35, 46, 125, 82; 348/7, 13, 6

[56] References Cited

U.S. PATENT DOCUMENTS

| | | | |
|---|---|---|---|
| 5,134,499 | 7/1992 | Sata et al. ................................. | 358/342 |
| 5,148,432 | 9/1992 | Gordon et al. ........................... | 371/10.1 |
| 5,357,276 | 10/1994 | Banker et al. ............................... | 348/7 |
| 5,414,455 | 5/1995 | Hooper et al. ............................... | 348/7 |
| 5,574,662 | 11/1996 | Windrem et al. ....................... | 364/514 |
| 5,586,264 | 12/1996 | Belknap et al. .................... | 395/200.08 |
| 5,630,067 | 5/1997 | Kindell et al. ..................... | 395/200.09 |
| 5,721,803 | 2/1998 | Haraguchi ................................. | 386/15 |
| 5,768,623 | 6/1998 | Judd et al. ............................... | 395/857 |

OTHER PUBLICATIONS

Lougher et al., The Impact of Digital Audio and Video on High–Speed Storage, pp.:84–89, 1994.
Lougher et al., The Design of a Storage Server for Continouos Media, pp.: 32–42, 1992.

*Primary Examiner*—Douglas W. Olms
*Assistant Examiner*—David R Vincent
*Attorney, Agent, or Firm*—Frommer Lawrence & Haug, LLP.; William S. Frommer

[57] ABSTRACT

A VOD delivery system for delivering program data such as of movies or the like on a real-time basis which are requested by subscribers from time to time, in response to the requests from the subscribers has a reduced number of magnetooptical disks and a reduced number of identical programs available. The VOD delivery system has a library including an automatic cassette changer, a plurality of magnetooptical disk drives each having a plurality of playback heads, a distributor/exchanger circuit for delivering reproduced information from the magnetooptical disk drives to subscriber's residences which have requested a source or sources, and a control computer for controlling the magnetooptical disk drives to output reproduced information from the playback heads depending on access timing from the subscriber's residences.

18 Claims, 12 Drawing Sheets

| Source ID | Reel ID | Address |
|---|---|---|
| ID 001 | Reel 1 | 1h20m6s1f |
| ... | ... | ... |
| ID 101 | Reel 20 | 1h10m4s2f |

DB2:

| Source ID | Address | Equipment ID | Data Length |
|---|---|---|---|
| ID 001 | 10 | M001 | 1800 |
| ... | ... | ... | ... |
| ID 101 | 200 | MOMs | 1200 |

DB3:

| Reel ID | BIN NO. |
|---|---|
| Reel 1 | BIN 1 |
| ... | ... |
| Reel 2 | BIN 30 |

FIG.11

| No. of Subscriber Residenes | No. of 25% Peak Subscriber Residences | No. of 2-Hour Movies in Storage | Transmission Conditions |
|---|---|---|---|
| 6000 | 4000 (Maximum of 1000 Requests Simultaneously Processed) (m=1000) | 1000 (n=10000) | • MPEG-1 Use of Compression at 1.5 [Mb/s] (Video: 1.2 [Mb/s] Audio: 0.3 [Mb/s])<br>• ADSL Use of Telephone Line at 1.5 [Mb/s] |

FIG.12

| Specifications | | 1000 Program Stock Capacity | | Program Playback Time (SEC.) | Number of Required Playback Units |
|---|---|---|---|---|---|
| Medium | | Program/Medium | Access Time (MIN.) | | |
| D-T of Library | 30 [Mb/s] (Transfer Rate) 10 [GB] (Capacity) | 8 (Note 1) | 1250 Programs | 0.5 + 0.5 (Slowest) | 360 (Note 2) | 50(Note 3)×2 |
| MO of Copier Memory | 30 [Mb/s] (Transfer Rate) 1.5 [MB] (Capacity on One Side) | | | | | 1000/s |

2 - Hour
(Note 1) Movie Capacity = 1.5 [Mb] × 6 × 120 = 1.35 [GB]
    Program/Medium = 10 [GB] / 1.35 [GB] = 8
(Note 2) 2-Hour Movie Playback Time = 1.35 [GB] / 30 [Mb] = 360 (SEC)
(Note 3) Number of Playback Units Random Playback of 1000 2-Hour
    Movies One Request Per 7.2 Seconds
    1.35 [GB] / 30 [Mb] = 360 (SEC / Progrm) / 7.2 (SEC)
    = 50 Playback Units

INFORMATION TRANSMISSION SYSTEM HAVING A REDUCED NUMBER OF STORED PROGRAMS AND RECORDING MEDIA PLAYBACK DRIVES

This application is a continuation of application Ser. No. 08/774,899, now U.S. Pat. No. 5,721,803, filed on Dec. 27, 1996, which is a File Wrapper Continuation of application Ser. No. 08/280,353, filed on Jul. 26, 1994, now abandoned.

BACKGROUND OF THE INVENTION

The present invention relates to an information transmission system for use as, for example, a video-on-demand (VOD) delivery system for delivering program data such as of movies or the like on a real-time basis which are requested by subscribers from time to time, in response to the requests from the subscribers.

In a high-definition television broadcasting system or satellite broadcasting system, it has been customary for a subscriber to select a desired one of programs broadcast from a broadcasting station with a switch on a receiver.

One problem with the conventional process whereby the subscriber chooses from several programs broadcast from the broadcasting station is that the subscriber can enjoy only those programs transmitted by the broadcasting station. For example, if programs such as of movies or the like are available to a number of subscribers in a cable television system or the like, then the subscribers can select and see a desired program on a television display only while the program is being broadcast. This system is not convenient to the subscribers for the lack of program availability at the option of the subscribers.

There has recently been proposed a delivery system which delivers programs substantially on a real-time basis which have been requested from time to time by subscribers. If such a delivery system is implemented by a cable television system, then it becomes possible for a subscriber to select and enjoy a desired program at any desired time simply accessing the program.

A simplest arrangement for such a delivery system is composed of a plurality of playback units such as VTRs or disc recording and playback devices, a plurality of recording mediums on which programs have been recorded, and a controller for operating one of the playback units to play back one of the recording mediums when accessed by a subscriber.

In the delivery system, a number of subscribers may request a certain one of numerous programs to be delivered at the same time. In order for the delivery system to meet such demands from subscribers without delay, it is necessary that the delivery system have a maximum number of "m" playback units corresponding to the respective subscribers, and a maximum number of "n×m" programs where "n" is the number of different programs. If the number "m" of playback units is "1000" and the number "n" of different programs available is "10000", then the total number "n×m" of programs that should be ready for delivery becomes "10000000". Consequently, the delivery system is very large in scale and highly costly.

SUMMARY OF THE INVENTION

It is therefore an object of the present invention to provide an information transmission system having a reduced number of recording and playback units and a reduced number of programs, for delivering programs on a real-time basis which are requested from time to time by subscribers, in response to the requests from the subscribers.

According to the present invention, there is provided an information transmission system comprising a library composed of a plurality of first recording mediums and first playback means for automatically playing back the first recording mediums, a plurality of recording and playback units each composed of a randomly accessible second recording medium, recording means for recording information reproduced from the library on the randomly accessible second recording medium, and second playback means for reproducing recorded information from the randomly accessible second recording medium, information supply means for supplying output information from the recording and playback units selectively to at least one subscriber, and control means for controlling the recording and playback units to output the reproduced information from the second playback means depending on external access timing.

According to the present invention, there is also provided an information transmission system comprising a library composed of a plurality of first recording mediums and first playback means for automatically playing back the first recording mediums, a plurality of recording and playback units each composed of a randomly accessible second recording medium, recording means for recording information reproduced from the library on the randomly accessible second recording medium, and second playback means for reproducing recorded information from the randomly accessible second recording medium, a plurality of memory means for storing a predetermined amount of reproduced information from the second playback means, information supply means for supplying output information from the memory means selectively to at least one subscriber, and control means for controlling the information supply means to output the predetermined amount of reproduced information from the memory means depending on external access timing.

BRIEF DESCRIPTION OF THE DRAWINGS

FIG. 4 is a diagram showing, by way of example, databases used by the VOD delivery system shown in FIG. 1;

FIG. 11 is a diagram showing, by way of example, conditions in the VOD delivery system shown in FIG. 1;

FIG. 12 is a diagram showing, by way of example, specifications of the library and the copier memory in the VOD delivery system shown in FIG. 1.

DETAILED DESCRIPTION OF THE PREFERRED EMBODIMENTS

1st Embodiment

Figure 1:
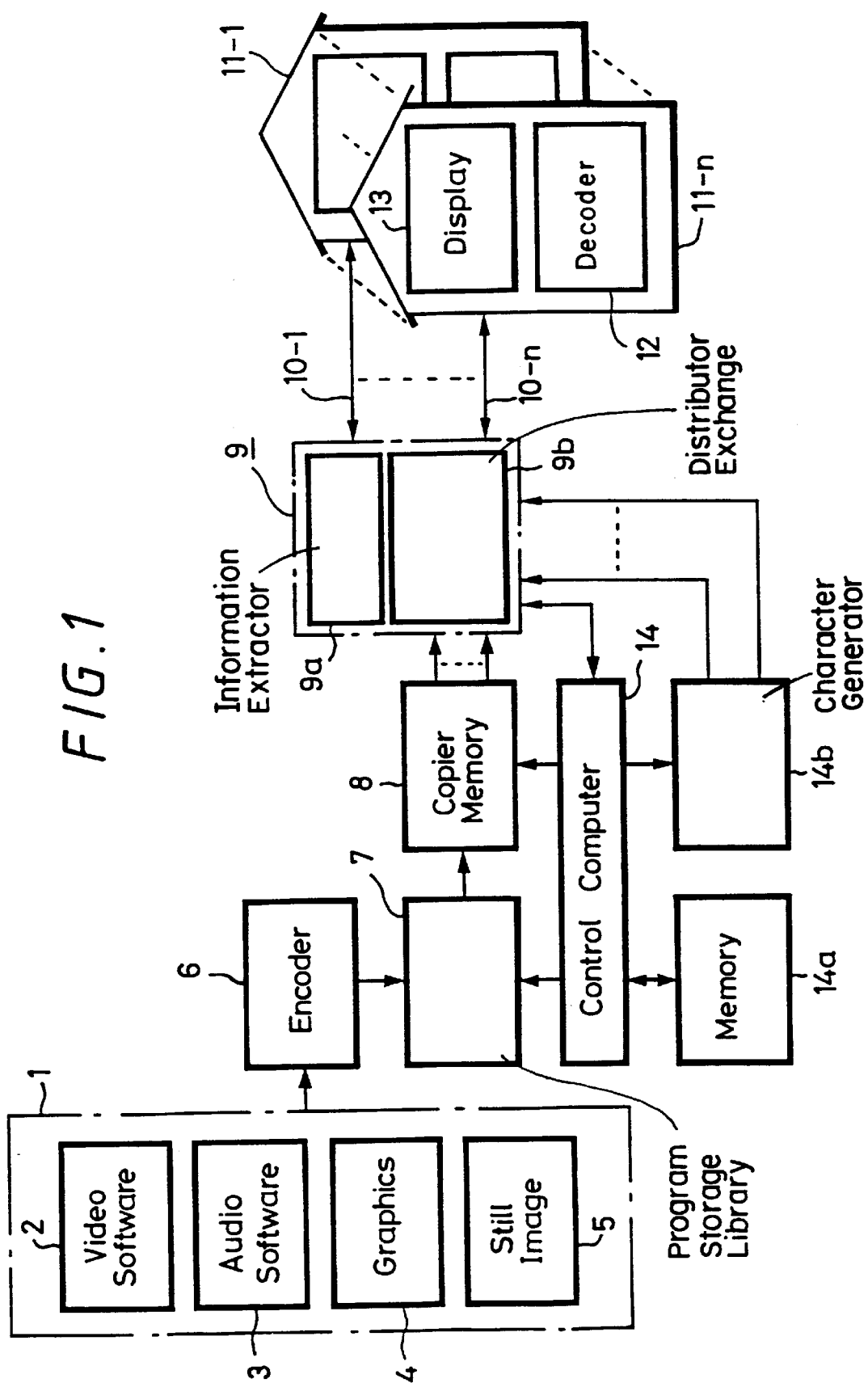
FIG. 1 is a block diagram of a video-on-demand (VOD) delivery system which incorporates an information transmission system according to the present invention.

FIG. 1 shows in block form a video-on-demand (VOD) delivery system which incorporates an information transmission system according to the present invention. As shown in FIG. 1, the information transmission system according to the present invention is preferably embodied in a VOD delivery system which delivers programs on a real-time basis which are requested from time to time by subscribers, in response to the requests from the subscribers. The information transmission system is of a relatively simple arrangement which does not require many recording and playback units and programs even when one program is requested by many subscribers at the same time.

The VOD delivery system is a system for giving program information through bidirectional transmission paths between a supply center and subscribers. In a wider sense, the VOD delivery system handles multimedia information including still images, high-quality television images, computer software, etc. However, the term "VOD delivery system" is often used in a narrower sense as a system for handling movies, television programs, etc.

As shown in FIG. 1, the VOD delivery system comprises a program software generator 1 for collecting, modifying, and adding values to various program software sources including video software 2, audio software 3, graphics 4, still images 5, etc. The program software generator 1 is preferably composed of external input analog video and audio terminals, a VTR (analog or digital), a magnetooptical disk driver, a hard disk drive, a digital audio tape (DAT) recorder, a personal computer, a work station, an electronic still camera, a video camera, a compact disc player, various optical disk drives, and an output circuit such as an interface circuit, an A/D converter, or the like.

The program software generated by the program software generator 1 is supplied to an encoder 6 in which it is compressed by discrete cosine transform (DCT) and encoded by run-length or Huffman coding. The program software is compressed or encoded to allow a large number of programs to be transmitted at high speed and reduce an area of recording medium which is consumed to store unit information.

The program software which has been compressed by the encoder 6 is recorded in a digital format on a video tape cassette by a VTR (described later on) in a library 7. A large amount of compressed program software is recorded on the video tape cassette in this manner. A copier memory 8, which corresponds to a recording and playback device according to the present invention, comprises a plurality of magnetooptical disk drives. The copier memory 8 is capable of temporarily storing a program requested by a subscriber from the program storage library 7, and thereafter reproducing the stored program. The VOD delivery system has a distributor/exchanger circuit 9 distributes the program software supplied from the copier memory 8 to distributors.

The library 7 comprises an automatic cassette changer, and the distributor/exchanger circuit 9 comprises an information extractor 9a and a distributor/exchanger 9b. The information extractor 9a serves to extract source ID data supplied from subscriber's residences 11-1–11-n, and the distributor/exchanger 9b serves to transmit reproduced information from the copier memory 8 to those of the subscriber's residences 11-1–11-n which have requested sources.

The VOD delivery system also has a control computer 14 for determining whether source ID data supplied from the information extractor 9a are registered in a database stored in a memory 14a or not. If the control computer 14 recognizes that source ID data from the subscriber's residences 11-1–11-n are recorded on the magnetooptical disks of the copier memory 8 and the copier memory 8 has an idle head, then the control computer 14 controls the copier memory 8 to reproduce a program from the magnetooptical disk.

The memory 14a may comprise a flash memory, a RAM (SRAM or DRAM) with a battery backup, or a silicon disk. Alternatively, since the memory 14a serves to store databases, it may comprise a large-capacity hard disk, a flexible disk having a storage capacity of 20 megabytes or more, a magnetooptical disk drive, an optical disk drive (phase-change medium or write-once medium).

FIG. 4 shows the databases stored in the memory 14a. In FIG. 4, the memory 14a stores databases DB1, DB2. The database DB1 is a database for recognizing what sources are recorded on the tape cassettes that are accommodated in the library 7. The database DB1 comprises source ID data, reel ID data, and address data. The source ID data are data indicative of sources supplied from the subscriber's residences 11-1–11-n, the reel ID data are data representing tape cassettes, and the address data are data indicating addresses from which sources are recorded on tape cassettes. Since tape cassettes normally employ time codes, the address data are time code data.

The database DB2 is a database for recognizing what sources are recorded on the magnetooptical disks of the copier memory 8. The database DB2 comprises source ID data, address data, equipment ID data, and data length data. The source ID data are the same as the source ID data in the database DB1. The address data are data representative of bin numbers and sector numbers. The equipment ID data are data representing the magnetooptical disk drive. The data length data are data indicative of the number of sectors from which sources are recorded from addresses indicated by the address data.

In FIG. 4, the data are given as an example which is easily comprehensible. The database DB1 has uppermost data including source ID data "ID001", reel ID data "Reel1", and address data "1h20m6s1f", indicating that a source represented by the source ID data "ID001" is recorded on a tape cassette indicated by the reel ID data "Reel1" from a position indicated by the address data "1h20m6s1f". The database DB1 has lowermost data including source ID data "ID101", reel ID data "Reel20", and address data "1h10m4s2f", indicating that a source represented by the source ID data "ID101" is recorded on a tape cassette indicated by the reel ID data "Reel20" from a position indicated by the address data "1h10m4s2f". In the address data, "h" represents an hour, "m" a minute, "s" a second, and "f" a frame.

The database DB2 has uppermost data including source ID data "ID001", address data "10", equipment ID data "MO01", and data length data "1800", indicating that a source represented by the source ID data "ID001" is set in a magnetooptical disk drive indicated by the equipment ID data "MO01" and recorded on a magnetooptical disk from a sector "10" to a sector "1800". The database DB2 has lowermost data including source ID data "ID101", address data "200", equipment ID data "MOMs", and data length data "1200", indicating that a source represented by the source ID data "ID101" is set in a magnetooptical disk drive indicated by the equipment ID data "MOMs" and recorded on a magnetooptical disk from a sector "200" to a sector "1200".

Referring back to FIG. 1, if the control computer 14 recognizes that a source indicated by the source ID data supplied from the subscriber's residences 11-1–11-n is recorded on a video tape cassette in the library 7, then the control computer 14 controls the library 7 to play back the video tape cassette to reproduce the recorded source therefrom, and controls the copier memory 8 to record the reproduced information from the library 7 and then reproduce the recorded information.

If the control computer 14 recognizes that a source indicated by the source ID data supplied from the subscriber's residences 11-1–11-n is not recorded on either a video tape cassette in the library 7 or a magnetooptical disk of the copier memory 8, then the control computer 14 controls a character generator (CG) 14b to output character data representative of a message, e.g., "REQUESTED SOURCE IS NOT AVAILABLE", indicating that the source requested by the subscribers is not available.

The distributor/exchanger 9b of the distributor/exchanger circuit 9 delivers the reproduced information supplied from the copier memory 8 and the character data supplied from the character generator 14b selectively to the subscriber's residences 11-1–11-n from which the source ID data have been delivered.

Therefore, if the source indicated by the source ID data supplied from the subscriber's residences 11-1–11-n is recorded in the library 7 or the copier memory 8, then the reproduced information therefrom can be supplied to the distributor/exchanger circuit 9 and selectively to transmission paths 10-1–10-n connected respectively to the subscriber's residences 11-1–11-n, and if the source indicated by the source ID data supplied from the subscriber's residences 11-1–11-n is not recorded in the library 7 or the copier memory 8, then the message indicative of unavailability of the source is supplied to the subscriber's residences 11-1–11-n.

Each of the subscriber's residences 11-1–11-n has a decoder 12 for expanding and decoding a program delivered through a corresponding one of the transmission paths 10-1–10-n, and a display unit 13 for displaying the program. The control computer 14 serves to control the VOD delivery system, and is particularly able to determine timing to enable the copier memory 8 to reproduce a requested program without delay.

Figure 2:
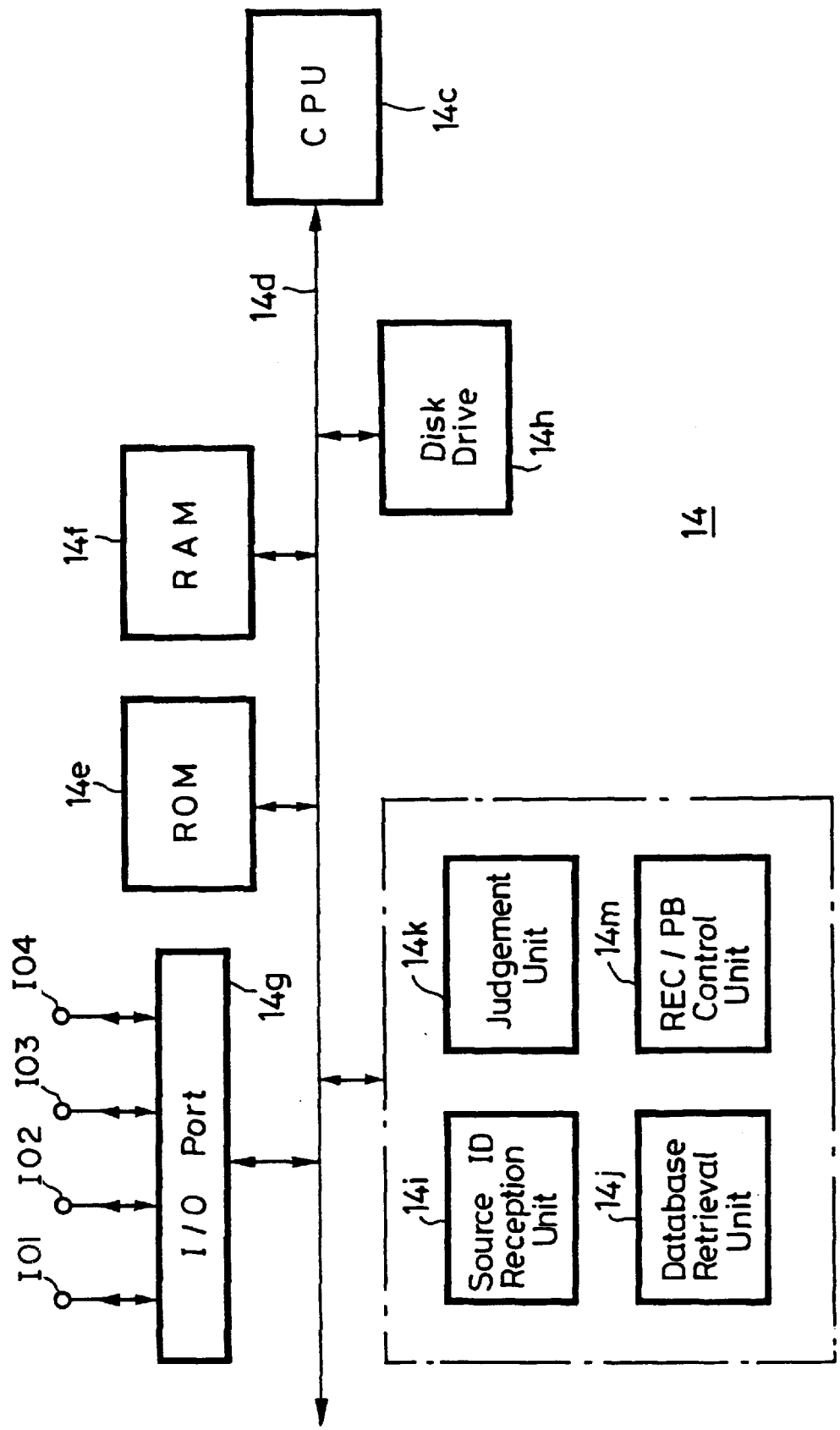
FIG. 2 is a block diagram of a control computer of the VOD delivery system shown in FIG. 1.

FIG. 2 shows a detailed internal structure of the control computer 14 shown in FIG. 1.

The control computer 14 has input/output terminals IO1–IO4 connected to the library 7, the copier memory 8, the character generator 14b, and the distributor/exchanger circuit 9. The input/output terminals IO1–IO4 are also connected through an input/output port 14g to a bus 14d which comprises address, data, and control buses. The control computer 14 also includes a CPU 14c, a ROM 14e, a RAM 14f, and a disk drive 14h which are connected to the bus 14d.

The disk drive 14h comprises a hard disk drive, an optical disk drive, a flexible disk drive, or the like. The control computer 14 has a plurality of main function units 14i, 14j, 14k, 14m. The main function units 14i, 14j, 14k, 14m include a source reception unit 14i for receiving source ID data extracted by the information extractor 9a shown in FIG. 1, a database retrieval unit 14j for determining whether the databases DB1, DB2 stored in the memory 14a shown in FIG. 1 contain source ID data identical to requested source ID data and retrieving information corresponding to the source ID data, a judgement unit 14k for determining whether there is a request for a source and whether a magnetooptical disk drive has an idle head, and a recording/playback control unit 14m for reading necessary data, e.g., address data and data length data, from the databases DB1, DB2 and supplying the read address data and data length data to the library 7 and the copier memory 8 to record and reproduce information.

There are three alternative ways available to perform the functions of the source reception unit 14i, the database retrieval unit 14j, the judgement unit 14k, and the recording/playback control unit 14m in the control computer 14. According to the first alternative, program data for performing the functions of the source reception unit 14i, the database retrieval unit 14j, the judgement unit 14k, and the recording/playback control unit 14m are stored in the ROM 14e. According to the second process, the disk drive 14h which comprises a hard disk drive, an optical disk drive, or a flexible disk drive stores program data for performing the functions of the source reception unit 14i, the database retrieval unit 14j, the judgement unit 14k, and the recording/playback control unit 14m. According to the third choice, each of the source reception unit 14i, the database retrieval unit 14j, the judgement unit 14k, and the recording/playback control unit 14m is hardware-implemented, i.e., composed of a combination of ICs or digital ICs.

The arrangement shown in FIG. 2 can be achieved by either one of the above three alternatives. The CPU 14c, RAM 14f, the ROM 14e, the input/output port 14g, the disk drive 14h, the source reception unit 14i, the database retrieval unit 14j, the judgement unit 14k, and the recording/playback control unit 14m jointly make up the control computer 14.

Figure 3:
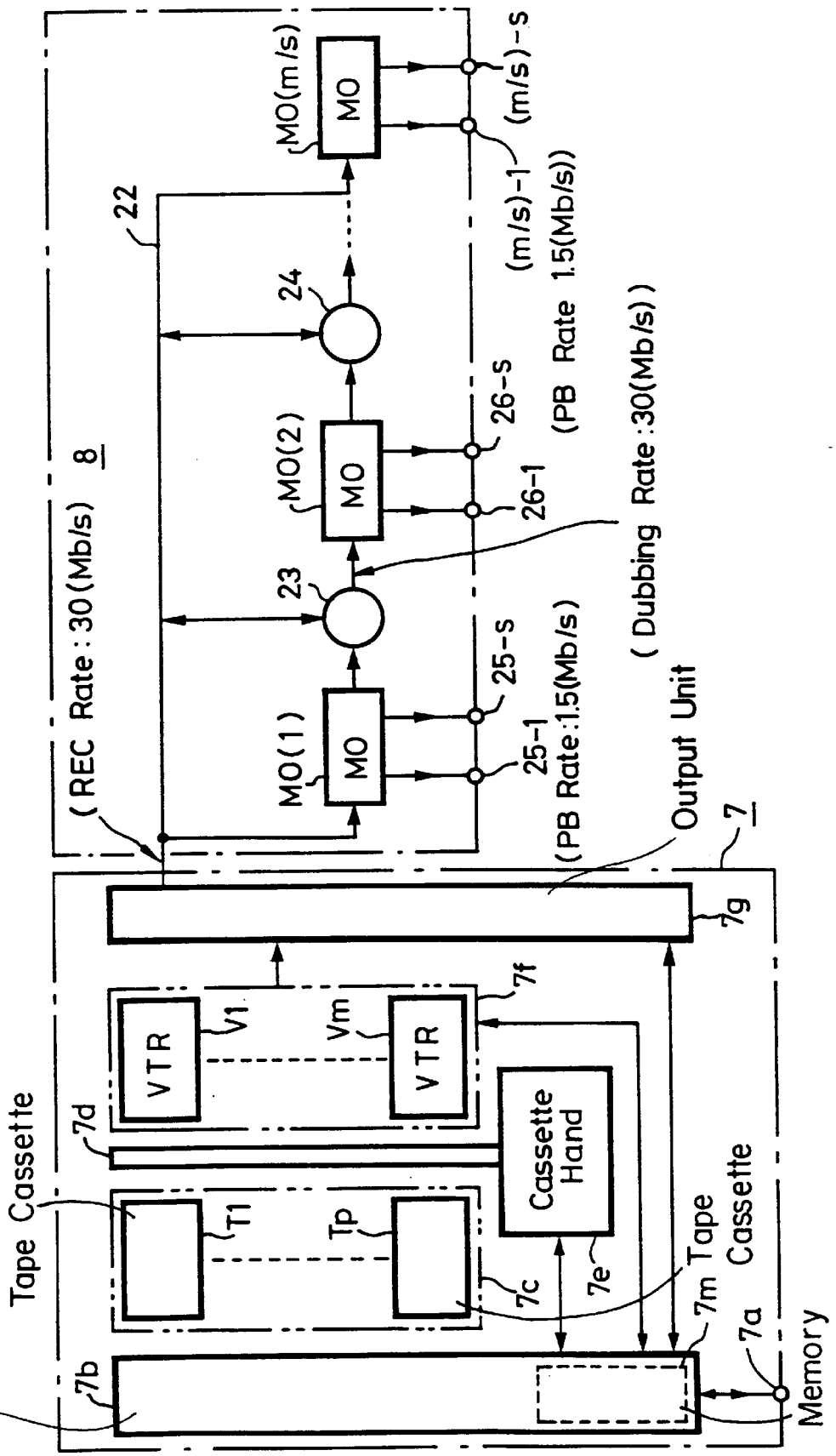
FIG. 3 is a block diagram of a library and a copier memory of the VOD delivery system shown in FIG. 1.

FIG. 3 shows the library 7 and the copier memory 8 in specific detail. The library 7 and the copier memory 8 will be described below with reference to FIG. 3.

The library 7 comprises a changer controller 7b, a bin assembly 7c housing a plurality of tape cassettes T1–Tp, a VTR section 7f composed of a plurality of VTRs V1–Vm, an output unit 7g, and a cassette hand 7e for taking a desired one of the tape cassettes T1–Tp from the bin assembly 7c and setting the removed tape cassette into a desired one of the VTRs V1–Vm.

The bin assembly 7c comprises a plurality of bins which accommodates the respective tape cassettes T1–Tp, the bins being marked with respective seals having printed bar codes which represent respective bin numbers. The cassette hand 7e has a bar code reader for reading the bin number data represented by the bar codes. Alternatively, a light-emitting device or a light-detecting device may be attached to each bin, and a light-detecting device or a light-emitting device may be attached to the cassette hand 7e, so that any of the bins can be identified by the number of times that light emitted from the light-emitting device or devices is detected by the light-detecting device or devices.

The library 7 has an input/output terminal 7a for inputting a control signal from the control computer 14 shown in FIG. 1 and reel ID data and address data from the database DB1 shown in FIG. 4, and outputting data indicative of processing procedures to the control computer 14. Based on a control signal supplied through the input/output terminal 7a and reel ID data and address data from the database DB1, the changer controller 7b reads corresponding bin number data from a database stored in a memory 7m, and controls cassette hand 7e and the VTRs V1–Vm according to the bin number data.

Specifically, the changer controller 7b reads, from the memory 7m, bin number data corresponding to reel ID data of the database DB1 which are supplied from the control computer 14 through the input/output terminal 7a, controls the cassette hand 7e based on the bin number data to take a corresponding one of the tape cassettes T1–Tp from the bin assembly 7c, and sets the removed tape cassette into one of the VTRs V1–Vm of the VTR section 7f. The changer controller 7b also controls the VTR to bring the tape in the set tape cassette into a position (including a pre-roll time) immediately in advance of a position indicated by the address data supplied through the input/output terminal 7a. A reproduced output signal from the VTR section 7f is supplied through the output unit 7g to the copier memory 8.

FIG. 4 also shows the database stored in the memory 7m. The database, denoted at DB3, stored in the memory 7m comprises reel ID data and bin number data. The reel ID data are data for identifying tape cassettes, as with the reel ID data of the database DB1, and the bin number data are data for indicating positions in the bin assembly 7c shown in FIG. 3.

In the example shown in FIG. 4, the database DB3 has uppermost data including reel ID data "Reel1" and bin number data "BIN1", indicating that a tape cassette indicated by the reel ID data "Reel1" is stored in a position indicated by the bin number data "BIN1" in the bin assembly 7c. The database DB3 has lowermost data including reel ID data "Reel2" and bin number data "BIN30", indicating that a tape cassette indicated by the reel ID data "Reel2" is stored in a position indicated by the bin number data "BIN30" in the bin assembly 7c. It can be seen from FIG. 4 that a source represented by the source ID data "ID001" of the uppermost data in the database DB1 is recorded on the tape cassette indicated by the reel ID data "Reel1" in the database DB3, and the tape cassette is stored in the position indicated by the bin number data "BIN1" in the bin assembly 7c.

As shown in FIG. 3, the copier memory 8 as a recording and playback device according to the present invention has a plurality of "m/s" magnetooptical disk drives MO(1), MO(2)–MO(m/s) connected in series so as to be capable of dubbing information "m/s" times. The magnetooptical disk drives MO(1), MO(2)–MO(m/s) are interconnected by a bypass 22 and switchers 23, 24.

The number "m" is a maximum value by which one program can be reproduced at the same time, and the number "s" is the number of output terminals 25, 26 of the magnetooptical disk drives MO(1), MO(2). If there are "s+1" or more requests for one program, then a program which is the same as the programs reproduced by the magnetooptical disk drive MO(1) needs to be reproduced by the magnetooptical disk drive MO(2), the switcher 23 is controlled to supply an output signal from the magnetooptical disk drive MO(1) to the magnetooptical disk drive MO(2) to allow the magnetooptical disk drive MO(2) to dub the program reproduced by the magnetooptical disk drive MO(1).

If there are "s" requests for one program and "s+1"st and further requests for another program, then since a program which is different from the programs reproduced by the magnetooptical disk drive MO(1) needs to be reproduced by the magnetooptical disk drive MO(2), the switcher 23 is controlled to supply the other program from the bypass 22 to the magnetooptical disk drive MO(2). The switcher 24 is also controlled to supply the other program from the bypass 22.

Figure 5:
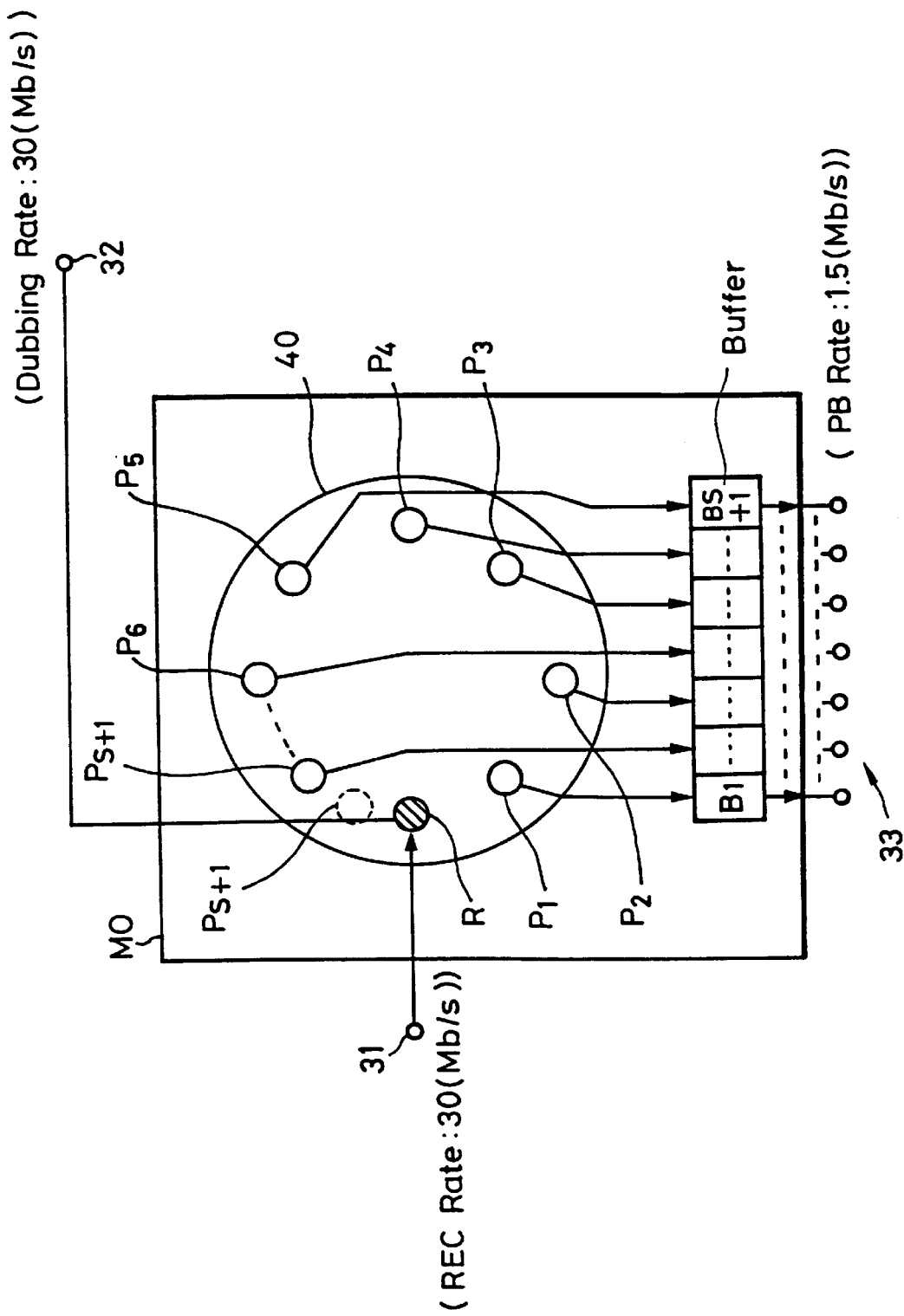
FIG. 5 is a diagram showing an arrangement of each of magnetooptical disk drives of the copier memory of the VOD delivery system shown in FIG. 1.

FIG. 5 shows an arrangement of each of magnetooptical disk drives of the copier memory 8. The magnetooptical disk drive, generally denoted at MO, has a single recording and dubbing playback head R for high-speed recording and dubbing playback operation. The magnetooptical disk drive MO also has "s" playback heads P1–Ps for independent playback operation at a normal playback speed. The recording and dubbing playback head R and the playback heads P1–Ps are radially movable back and forth across a magnetooptical disk 40 such that a sector in a track on the magnetooptical disk 40 which has been recorded by the recording and dubbing playback head R can be played back by the playback heads P1–Ps.

In this embodiment, the playback heads P1–Ps are used to reproduce recorded information magnetooptical disk 40 according to requests from the subscriber's residences 11-1–11-n, and the recording and dubbing playback head R is used to reproduce recorded information from the magnetooptical disk 40 for dubbing the same on another magnetooptical disk 40, or as a spare head for use in emergency. Therefore, even when all the playback heads P1–Ps of the magnetooptical disk drive MO are in operation, recorded information can be reproduced from the magnetooptical disk 40 by the recording and dubbing playback head R, outputted from a dubbing output terminal 32, and recorded on a magnetooptical disk 40 in another magnetooptical disk drive MO. The recorded information can then immediately be reproduced from the magnetooptical disk 40 in the other magnetooptical disk drive MO and supplied to any of the subscriber's residences 11-1–11-n which request the information.

Recorded information or programs outputted from the playback heads P1–Ps are supplied to respective buffers B1–Bs where they are stored, and then supplied from the buffers B1–Bs to respective output terminals 33. The timing with which the programs are outputted from the buffers B1–Bs to the respective output terminals 33 is controlled by the control computer 14 based on demand control signals 15 from the subscriber's residences 11-1–11-n.

A program supplied through an input terminal 31 is recorded on the magnetooptical disk 40 by the recording and dubbing playback head R. A recorded program can be supplied through the output terminal 32 to a next magnetooptical disk drive MO for being dubbed on the magnetooptical disk 40 therein. Each of the recording and dubbing playback head R and the playback heads P1–Ps is associated with a servo mechanism and a signal processor which operate to record and reproduce desired information or programs on and from the magnetooptical disk 40.

The VOD delivery system operates as follows:

As shown in FIG. 1, when a subscriber issues a delivery request for a movie program from one of the subscriber's residences 11-1–11-n using a commander (not shown) in the subscriber's residence, a demand control signal representing the delivery request is supplied through a corresponding one of the transmission paths 10-1–10-n to the control computer 14.

The control computer 14 decodes the delivery request, reproduces the requested movie program from the library 7, stores the movie program in the copier memory 8, and then transmits the movie program through the distributor/exchanger circuit 9. The transmitted movie program is then decoded by the decoder 13 and displayed on the display unit 13 for the subscriber to see.

A process of reproducing a program stored in the copier memory 8 will be described below. As shown in FIG. 3, the library 7 stores source programs such as of video software which have been compressed by the encoder 6. When a request from a subscriber is received at any time, one of the tape cassettes T1–Tp which stores the requested program is set in one of the VTRs V1–Vm in the library 7, and the program is reproduced from the tape cassette and then supplied to the copier memory 8. In the copier memory 8, the supplied program is recorded on the magnetooptical disk 40 by the magnetooptical disk drive MO(1), and then reproduced. In the library 7, the tape cassettes T1–Tp can automatically be set in the VTRs V1–Vm by the automatic cassette changer as described above.

The program is reproduced from the tape cassette at a high rate of 30 [Mb/s] which is the same as the recording rate of the magnetooptical disk drive MO(1). The magnetooptical disk drive MO(1) is controlled by the control computer 14 to rotate its magnetooptical disk 40 at a speed which allows the program to be recorded at a rate of 30 [Mb/s]. Therefore, the program reproduced from the tape cassette can be recorded on the magnetooptical disk 40 in the magnetooptical disk drive MO(1) continuously at the high recording rate.

In the magnetooptical disk drive MO(1), immediately after a program has been recorded on the magnetooptical disk 40 in a recording mode by the recording and dubbing playback head R, the recorded program has to be reproduced by the playback heads P1–Ps for being quickly and directly supplied through the output terminals 33. In a playback mode, the reproduced program is outputted at a playback rate of 1.5 [Mb/s]. Since the playback rate is of a low value which is 1/20 of the recording rate, the playback operation will never outspeed the recording operation. Therefore, no problem arises when the recorded program is reproduced by each of the playback heads P1–Ps immediately after the recording mode carried out by the recording and dubbing playback head R.

Each of the buffers B1–Bs has a predetermined storage capacity. The storage capacity of each of the buffers B1–Bs is determined as follows: Reproduced program data are transferred from the magnetooptical disk 40 to each of the buffers B1–Bs at the rate of 30 [Mb/s], and the program data stored in each of the buffers B1–Bs are outputted therefrom through the output terminal 33 at a rate of 1.5 [Mb/s] which is 1/20 of the transfer rate of 30 [Mb/s].

Figure 6:
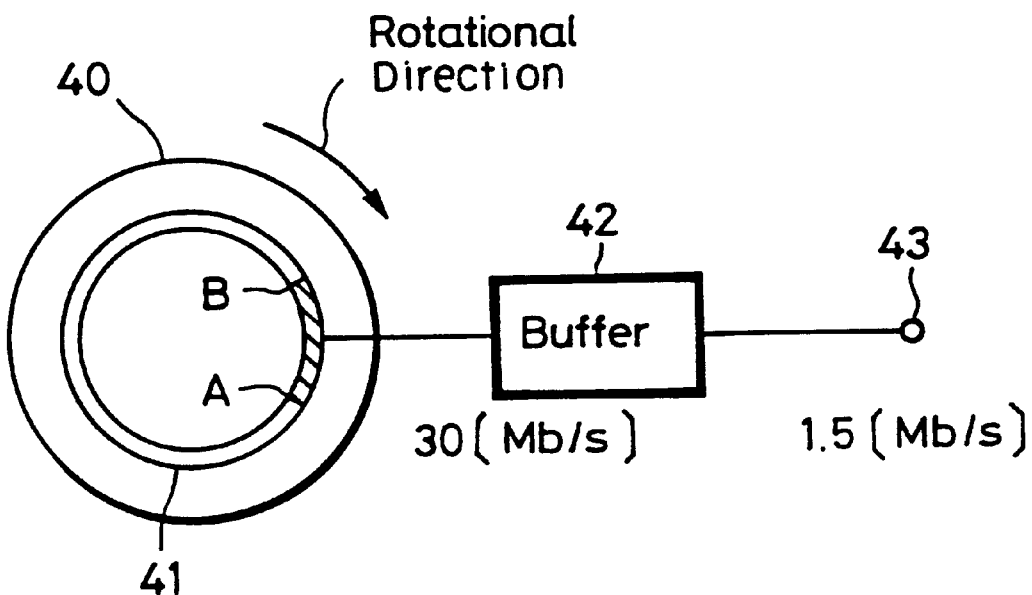
FIG. 6 is a diagram illustrative of the relationship between a magnetooptical disk drive and a buffer which are shown in FIG. 5.

As shown in FIG. 6, the storage capacity of each of the buffers B1–Bs, denoted at 42, is determined such that after a head over the magnetooptical disk 40 has transferred data ranging from a point A to a point B on a track 41 on the magnetooptical disk 40 to the buffer 42, the head can reproduce data following the point B and fully supply the reproduced data to the buffer 42 before all the data previously stored in the buffer 42, i.e., the data ranging from the point A to the point B, have been read from the buffer 42. Stated otherwise, the storage capacity of the buffer 42 is determined to be large enough to be able to output the stored data from the buffer 42 continuously through an output terminal 43 which corresponds to the output terminal 33 shown in FIG. 5.

The storage capacity of the buffer 42 is related to the transfer rate of 30 [Mb/s] from the magnetooptical disk 40 to the buffer 42 and the output rate of 1.5 [Mb/s] from the buffer 42 to the output terminal 43. Because the ratio of the output rate to the transfer rate is 1/20, when the magnetooptical disk 40 rotates once, the buffer 42 is required to store 1/20 data. For example, if the storage capacity of one track 41 on the magnetooptical disk 40 is 100 [kilobytes (KB)], then the storage capacity of the buffer 42 is required to be at least 5 [KB].

Figure 7:
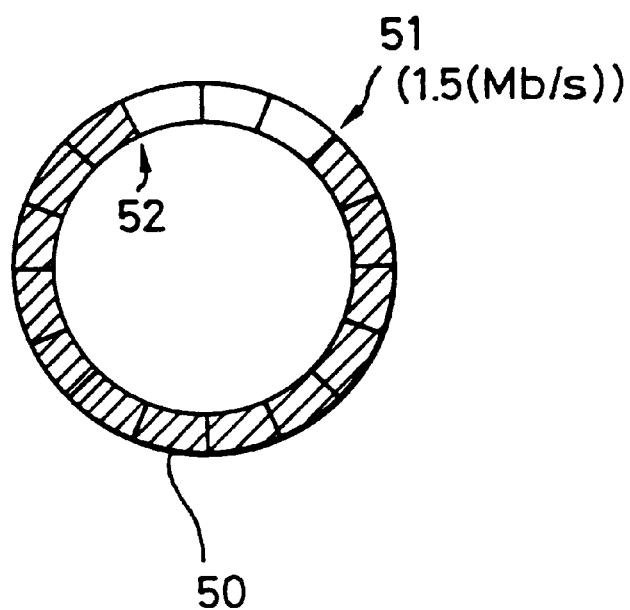
FIG. 7 is a diagram showing a cue memory of the buffer shown in FIG. 6.

As shown in FIG. 7, the buffer 42 comprises a cue memory 50 in the form of a ring-shaped array of memory elements. In a reading mode, recorded data are read from the cue memory 50 at a read pointer 51 at a constant rate of 1.5 [Mb/s]. In a writing mode, data are written in the cue memory 50 at a write pointer 52 at a higher speed in a period of time which is 1/20 of the reading time. Since the write pointer 52 should not pass the read pointer 51, when the write pointer 52 is about to pass the read pointer 51, the writing mode is interrupted. The writing mode is then started again to write data following the previously written data.

In the copier memory 8, when a request for a program is received from a subscriber, the program is recorded on the magnetooptical disk 40 by the recording and dubbing playback head R of the magnetooptical disk drive MO(1), and almost simultaneously reproduced by the playback head P1 and transmitted through the buffer B1 and the output terminal 33 to the subscriber who has requested the program. Inasmuch as the recording rate is higher than the playback rate, the playback heads P1–Ps intermittently read recorded data in conformity with the lower playback rate, and the reproduced data are continuously outputted from the buffers B1–Bs.

When another request for the same program as the above program is received from another subscriber, the same program is reproduced from the magnetooptical disk 40 by the playback head P2. Consequently, "s" identical programs can fully independently be reproduced from the magnetooptical disk 40 by the respective playback heads P1–Ps. If "s" requests for a program are received and "s+1"st and following requests for another program are received, then "s" identical programs are reproduced by the magnetooptical disk drive MO(1), and the switcher 23 is controlled to supply the other program from the library 7 (see FIG. 3) through the bypass 22 to the next magnetooptical disk drive MO(2). In the magnetooptical disk drive MO(2), the other program is recorded and reproduced to meet the "s+1"st and following requests.

If "s" requests for a program are received and an "s+1"st request for the same program is received, then the requested program is reproduced from the magnetooptical disk 40 by the recording and dubbing playback head R of the magnetooptical disk drive MO(1), and the switcher 23 is controlled to supply the reproduced program from the magnetooptical disk drive MO(1) to the magnetooptical disk drive MO(2). The program supplied to the magnetooptical disk drive MO(2) is then recorded on the magnetooptical disk 40 by the recording and dubbing playback head R of the magnetooptical disk drive MO(2), and the recorded program is reproduced from the magnetooptical disk 40 by the playback head P1 of the magnetooptical disk drive MO(2).

Stated otherwise, if there are "s" requests for a program "A", the control computer 14 controls the magnetooptical disk drive MO to record the program "A" supplied from the library 7 on the magnetooptical disk 40 with the recording and dubbing playback head R, reproduce the recorded program "A" successively with the playback heads P1–Ps, store the reproduced programs "A" in the respective buffers B1–Bs, start recording a program "B" succeeding the program "A" on the magnetooptical disk 40 with the recording and dubbing playback head R, and deliver the stored programs "A" from the respective buffers B1–Bs before the program "B" is reproduced successively with the playback heads P1–Ps.

In order to reproduce the recorded programs "A" from the magnetooptical disk 40 successively with the playback heads P1–Ps, the control computer 14 designates a starting track and a starting sector of tracks and sectors where the program "A" is recorded, and a sector length for the control of the magnetooptical disk drive MO.

Figure 9:
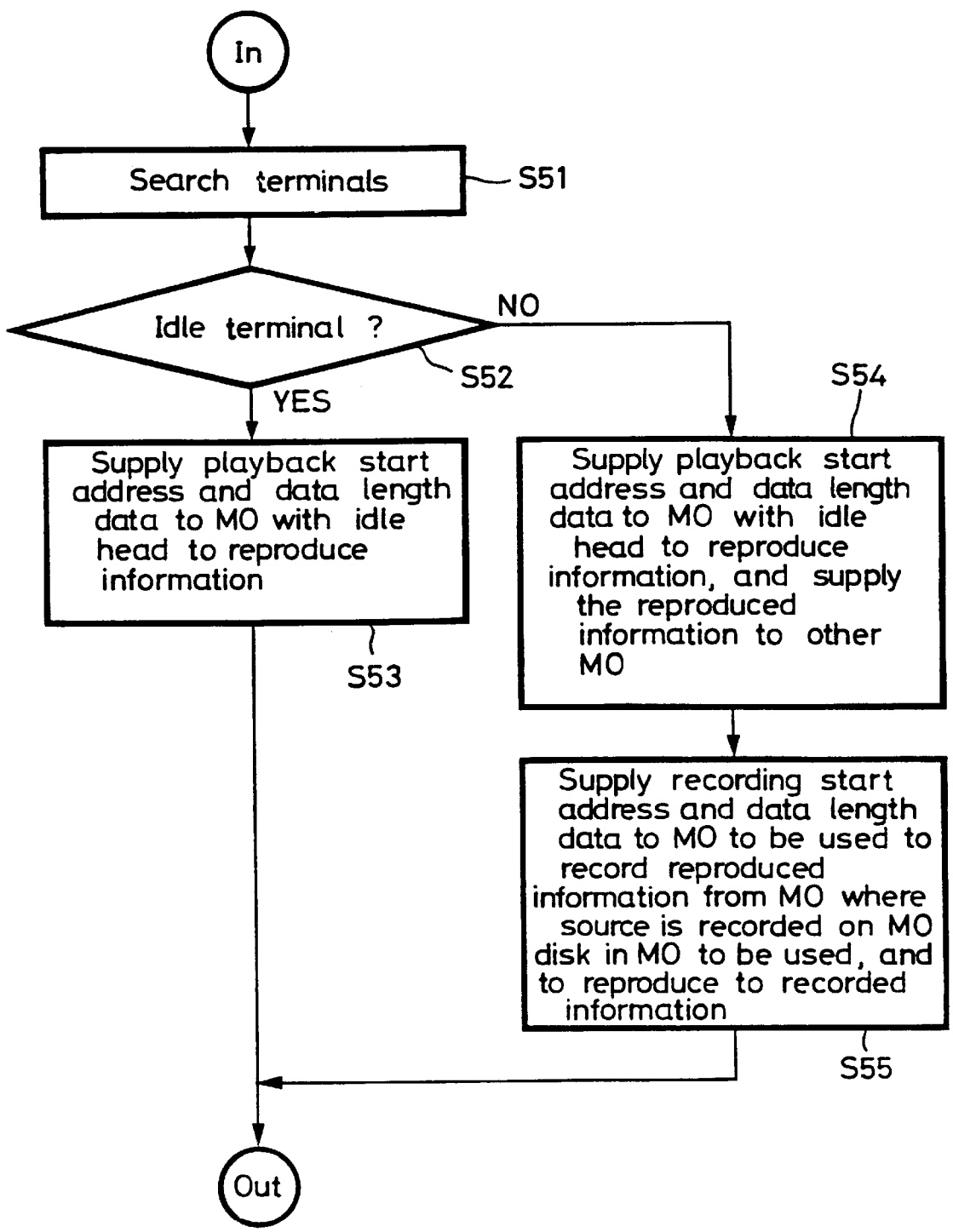
FIG. 9 is a flowchart of an MO routine in the operation sequence shown in FIG. 8.
Figure 10:
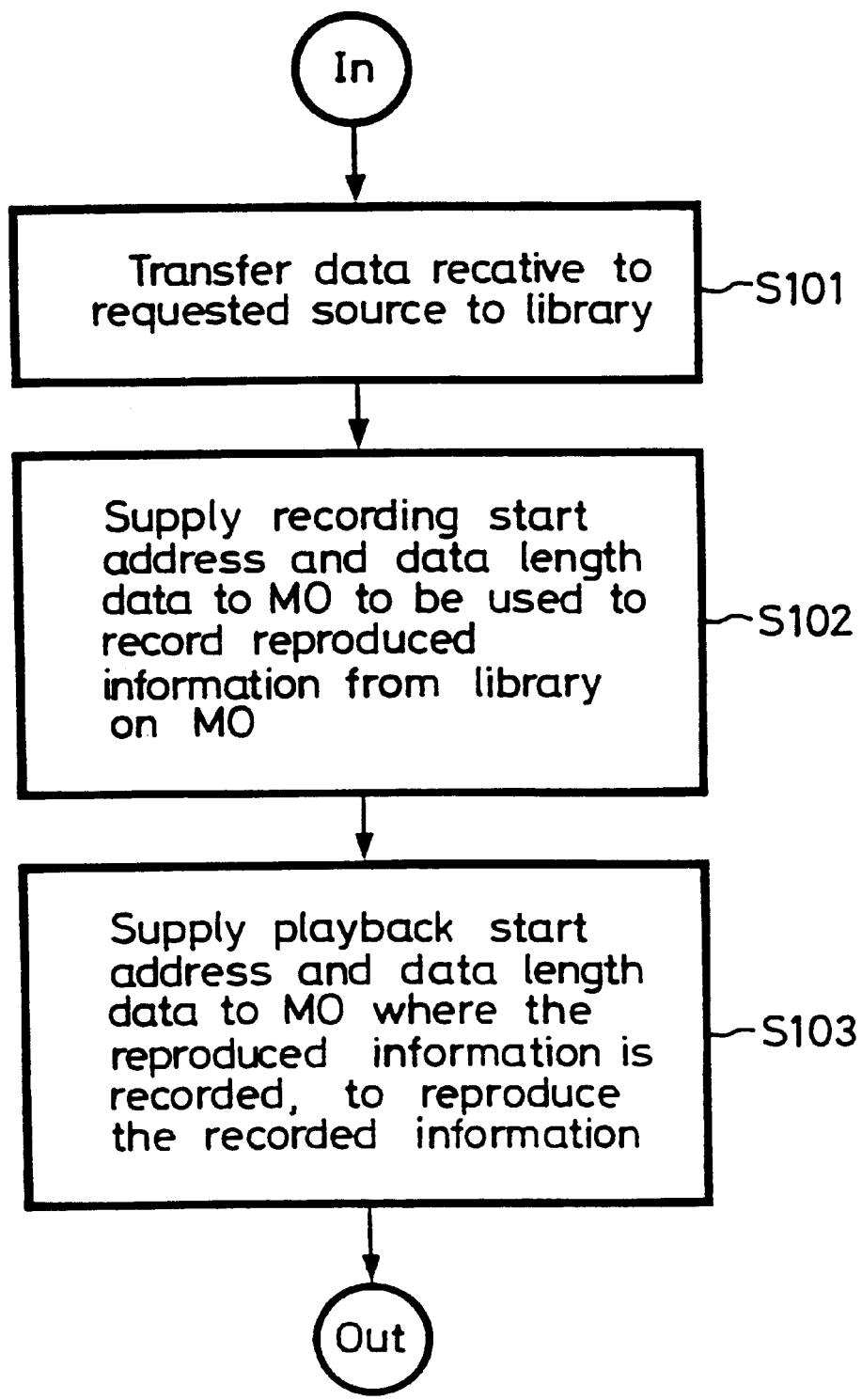
FIG. 10 is a flowchart of a tape routine in the operation sequence shown in FIG. 8.

A process of controlling the VOD delivery system with the control computer 14 will be described below with reference to FIGS. 8 through 10.

Figure 8:
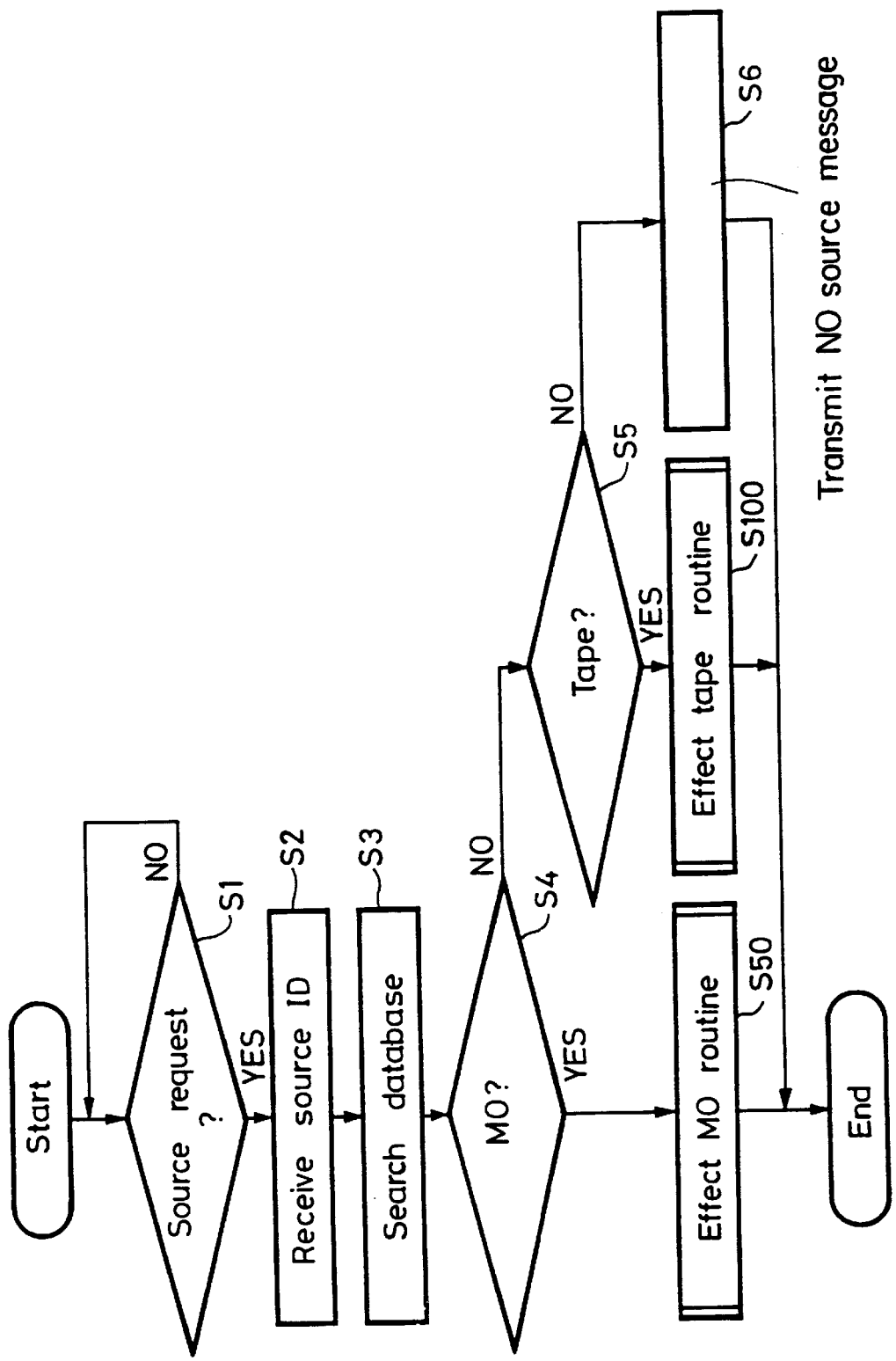
FIG. 8 is a flowchart of an operation sequence of the VOD delivery system shown in FIG. 1.

As shown in FIG. 8, the control computer 14 determines whether there is a request for a source or not in a step S1. If there is a source request (YES), then control proceeds to a step S2 in which the control computer 14 receives source ID data. Specifically, source ID data from the subscriber's residences 11-1–11-n are supplied through the transmission paths 10-1–10-n to the distributor/exchanger circuit 9, and extracted by the information extractor 9a. The extracted source ID data are supplied to the control computer 14. The source reception unit 14i of the control computer 14 receives the source ID data from the distributor/exchanger circuit 9. Thereafter, control proceeds to a step S3.

In the step S3, the control computer 14 searches the databases. Specifically, the database retrieval unit 14j of the control computer 14 searches the databases DB1, DB2 stored in the memory 14a to determine whether the databases DB1, DB2 have source ID data identical to the source ID data supplied from the distributor/exchanger circuit 9. Thereafter, control proceeds to a step S4.

In the step S4, the database retrieval unit 14j of the control computer 14 determines whether source ID data identical to the received source ID data are contained in the database DB2 (see FIG. 4) stored in the memory 14a or not. If in the database DB2, then control proceeds to a step S50, and if not in the database DB2, then control goes to a step S5.

In the step S50, the control computer 14 executes an MO (magnetooptical disk) routine. After the MO routine, the process shown in FIG. 8 is ended.

In the step S5, the database retrieval unit 14j determines whether source ID data identical to the received source ID data are contained in the database DB1 (see FIG. 4) stored in the memory 14a or not. If in the database DB1, then control proceeds to a step S100, and if not in the database DB1, then control goes to a step S6.

In the step S100, the control computer 14 executes a tape routine. After the tape routine, the process shown in FIG. 8 is ended.

In the step S6, the control computer 14 delivers a message indicative of no source. Specifically, the control computer 14 recognizes that source ID data identical to the received source ID data are not contained in the databases DB1, DB2 stored in the memory 14a, and controls the character generator 14b to output character data which represent a message indicative of no source. The character data outputted from the character generator 14b are supplied to the subscriber's residences 11-1–11-n through the transmission paths 10-1–10-n, respectively. Thereafter, the sequence shown in FIG. 8 comes to an end.

The MO routine executed in the step S50 will be described below with reference to FIG. 9. The MO routine is executed if the control computer 14 determines that a source requested from the subscriber's residences 11-1–11-n is recorded on the magnetooptical disk in a magnetooptical disk drive in the step S4 shown in FIG. 8.

The control computer 14 searches the terminals or playback heads in a step S51. Specifically, the control computer 14 searches or scans the playback heads P1–Ps of the magnetooptical disk drives MO(1), MO(2), . . . MO(m/s) of the copier memory 8 shown in FIG. 8. Then, control goes to a step S52.

In the step S51, if the RAM 14f stores data indicative of whether the playback heads P1–Ps are in use or not at the time the recording/playback control unit 14m of the control computer 14 effects recording/playback control operation, then the control computer 14 searches the terminals by referring to the data stored in the RAM 14f. Alternatively, the recording/playback control unit 14m may cause the magnetooptical disk drives MO(1), MO(2), . . . MO(m/s) to indicate whether the playback heads P1–Ps are in use or not.

In the step S52, the control computer 14 determines whether there is an idle terminal or playback head or not. Specifically, the control computer 14 reads information corresponding to the source ID data supplied from the subscriber's residences 11-1–11-n from the database DB2 stored in the memory 14a, recognizes any of the magnetooptical disk drives MO(1), MO(2), . . . MO(m/s) in which a source corresponding to the requested source ID data is recorded, and determines whether the magnetooptical disk drive has any idle playback head with the recording/playback control unit 14m.

Since the judgement unit 14k of the control computer 14 controls the magnetooptical disk drives MO(1), MO(2), . . . MO(m/s), the recording/playback control unit 14m may determine whether the magnetooptical disk drive has any idle playback head by either storing information as to a presently controlled condition, e.g., use of the playback heads P1–Ps of the magnetooptical disk drives MO(1), MO(2), . . . MO(m/s), in the memory 14a or the RAM 14f, or obtaining information of any of the playback heads P1–Ps in use from the magnetooptical disk drives MO(1), MO(2), . . . MO(m/s). If there is any idle playback head (YES), then control proceeds to a step S53, and if there is no idle playback head (NO), then control goes to a step S54.

In the step S53, the control computer 14 supplies an address to start reproducing information and data length data to the magnetooptical disk drive with any idle playback head. Specifically, the recording/playback control unit 14m supplies address data and data length data to any of the magnetooptical disk drives MO(1), MO(2), . . . MO(m/s) which is indicated by equipment ID data read from the database DB2. Source information read from the magnetooptical disk 40 in the indicated one of the magnetooptical disk drives MO(1), MO(2), . . . MO(m/s) is supplied through the transmission paths 10-1–10-n to the subscriber's residences 11-1–11-n which have delivered the source ID data under the control of the recording/playback control unit 14m.

In the step S54, the control computer 14 supplies an address to start reproducing information and data length data to the magnetooptical disk drive with no idle playback head. Specifically, the recording/playback control unit 14m reads source ID data identical to the source ID data supplied from the subscriber's residences 11-1–11-n from the database DB2 stored in the memory 14a, and supplies the address data and data length data which have been read to any of the magnetooptical disk drives MO(1), MO(2), . . . MO(m/s) with no idle playback head. Information recorded on the magnetooptical disk 40 in any of the magnetooptical disk drives MO(1), MO(2), . . . MO(m/s) with no idle playback head is reproduced by the recording and dubbing playback head R, and the reproduced information is supplied through the switchers 23, 24 and the dubbing output terminal 32 to others of the magnetooptical disk drives MO(1), MO(2), . . . MO(m/s). Thereafter, control proceeds to a step S55.

In the step S55, the control computer 14 supplies an address to start recording information and data length data to the magnetooptical disk drive which is to be used to record the reproduced information from the magnetooptical disk drive where the source is recorded, on the magnetooptical disk 40 in the magnetooptical disk drive which is to be used, and then to reproduce the recorded information. Specifically, the recording/playback control unit 14m obtains address data of the magnetooptical disk 40 set in any of the magnetooptical disk drives MO(1), MO(2), . . . MO(m/s) which is to be used, based on data length data recorded together with the source ID data in the database DB2 stored in the memory 14a, and supplies the address data and data length data to any of the magnetooptical disk drives MO(1), MO(2), . . . MO(m/s) which is to be used. At this time, the recording/playback control unit 14m stores, in the database DB2, the source ID data, address data, equipment ID data, and data length data of the source dubbed on the magnetooptical disk 40 set in any of the magnetooptical disk drives MO(1), MO(2), . . . MO(m/s) which is to be used.

In the above control operation of the recording/playback control unit 14m, reproduced information from any of the magnetooptical disk drives MO(1), MO(2), . . . MO(m/s) with not idle playback head is recorded on the magnetooptical disk 40 set in any of the magnetooptical disk drives MO(1), MO(2), . . . MO(m/s) which is to be used. Then, the recording/playback control unit 14m supplies address data and data length data to any of the magnetooptical disk drives MO(1), MO(2), . . . MO(m/s) which is to be used, for thereby reproducing the information recorded on the magnetooptical disk 40 set in any of the magnetooptical disk drives MO(1), MO(2), . . . MO(m/s) which is to be used. The reproduced information is supplied through the distributor/exchanger 9 and the transmission paths 10-1–10-n to the subscriber's residences 11-1–11-n which have delivered the source ID data under the control of the control computer 14. Thereafter, the MO routine shown in FIG. 9 is brought to an end.

The tape routine executed in the step S100 will now be described below with reference to FIG. 10. The tape routine is executed if the control computer 14 determines that a source requested from the subscriber's residences 11-1–11-n is not recorded on any of the magnetooptical disks 40 in the magnetooptical disk drives MO(1), MO(2), . . . MO(m/s), but recorded in any of the tape cassettes V1–Vm stored in the library 7, in the step S5 shown in FIG. 8.

In a step S101, the control computer 14 transfers data relative to a requested source to the library 7. Specifically, the database retrieval unit 14j of the control computer 14 reads source ID data identical to the source ID data supplied from the subscriber's residences 11-1–11-n from the database DB1 stored in the memory 14a, and supplies the reel ID data and address data which have been read to the library 7. The reel ID data and address data are supplied through the input/output terminal 7a to the changer controller 7b shown in FIG. 3.

The changer controller 7b reads bin number data of reel ID data identical to the reel ID data supplied through the input/output terminal 7a, from the database DB3 stored in the memory 7m, and controls the cassette hand 73 based on the bin number data that have been read. The cassette hand 73 then remove any one of the tape cassettes T1–Tp which has the requested source recorded therein from the bin assembly 7c, and sets the removed tape cassette in one of the VTRs V1–Vm of the VTR section 7f.

Thereafter, the changer controller 7b controls the VTR to bring the tape in the set tape cassette into a position (including a pre-roll time) immediately in advance of a position indicated by the address data supplied through the input/output terminal 7a. When the tape is brought into that position, the changer controller 7b supplies a control signal to the VTR to operate the VTR in a playback mode. Thereafter, control proceeds to a step S102.

In the step S102, the control computer 14 supplies an address to start recording information and data length data to the magnetooptical disk drive which is to be used to record the reproduced information from the library 7, on the magnetooptical disk 40 in the magnetooptical disk drive which is to be used. Specifically, the recording/playback control unit 14m supplies address data and data length data to any of the magnetooptical disk drives MO(1), MO(2), . . . MO(m/s) with an idle playback head to record the reproduced information from the library 7, on the magnetooptical disk 40 in any of the magnetooptical disk drives MO(1), MO(2), . . . MO(m/s) with an idle playback head. Thereafter, control proceeds to a step S103.

In the step S103, the control computer 14 supplies an address to start reproducing information and data length data to the magnetooptical disk drive where the reproduced information is recorded, to reproduce the recorded information. Specifically, the recording/playback control unit 14m supplies address data and data length data to any of the magnetooptical disk drives MO(1), MO(2), . . . MO(m/s) where the reproduced information is recorded, to reproduce the recorded information from the magnetooptical disk 40 in any of the magnetooptical disk drives MO(1), MO(2), . . . MO(m/s) where the reproduced information is recorded. The reproduced information is supplied through the distributor/exchanger 9 and the transmission paths 10-1–10-n to the subscriber's residences 11-1–11-n which have delivered the source ID data under the control of the control computer 14. Thereafter, the tape routine shown in FIG. 10 is brought to an end.

FIG. 11 shows, by way of example, conditions for operating the VOD delivery system. As shown in FIG. 11, the number of subscriber's residences is 6000, and the 25%-peak number of subscriber's residences is 4000. At this time, a maximum of 1000 requests can be processed simultaneously. The number of 2-hour movies in storage is 10000. The transmission conditions are use of compression at 1.5 [Mb/s] (video: 1.2 [Mb/s] and audio: 0.3 [Mb/s]) under MPEG-I, and use of a telephone line at 1.5 [Mb/s] under ADSL.

FIG. 12 shows, by way of example, specifications of the library 7 and the copier memory 8 in the VOD delivery system shown in FIG. 1. As shown in FIG. 12, each of the tape cassettes D-T (T1–Tp in FIG. 2) in the library 7 has a transfer rate of 30 [Mb/s] and a storage capacity of 10 [GB], and each of the magnetooptical disk drives MO(1), MO(2), . . . MO(m/s) of the copier memory 8 has a transfer rate of 30 [Mb/s] and a storage capacity of 1.35 [GB] on one side of the magnetooptical disk 40.

The tape cassettes D-T have a program/medium ratio of the tape cassette D-T is 10 [GB]/1.35 [GB]=8, a 10000-program stock capacity of 1250 programs, a longest access time of 0.5+0.5 minute, a program playback time of 1.35

[GB]/30 [Mb]=360 seconds for a 2-hour movie, and requires 1.5 [GB]/30 [Mb]=360 (seconds/program)/7.2 (seconds)=50 playback units provided 1000 2-hour movies are played back at random and there is one request per 7.2 seconds.

While a maximum of 1000 playback units have heretofore been required, only "100/s" (where "s" is 1 or more) playback units are needed according to the present invention. The number of programs in storage may be 10000 according to the present invention, whereas 10000000 programs have heretofore been required to be ready for delivery. Therefore, the VOD delivery system according to the present invention is simpler in arrangement and less costly.

According to the first embodiment of the present invention, as described above, the video software 2, the audio software 3, the graphics 4, the still images 5, etc. are supplied from the program software generator 1 to the encoder 6 and compressed thereby, and the compressed information is recorded in the tape cassettes T1–Tp of the library 7. When there are source requests from the subscriber's residences 11-1–11-n, the source information is recorded on a magnetooptical disk in the copier memory 8, and then reproduced by the playback heads P1–Ps and supplied through the distributor/exchanger 9 and the transmission paths 10-1–10-n to the subscriber's residences 11-1–11-n. Source ID data supplied from the subscriber's residences 11-1–11-n are extracted by the information extractor 9a, and the databases DB1, DB2 stored in the memory 14a are searched for the source ID data by the database retrieval unit 14j of the control computer 14. If the source ID data are present in the database DB2, then the magnetooptical disk drives MO(1), MO(2), . . . MO(m/s) of the copier memory 8 are searched or scanned for any idle playback head. If there is an idle playback head, the recording/playback control unit 14m of the control computer 14 supplies address data and data length data to the copier memory 8 to reproduce recorded information from the magnetooptical disk 40 in any of the magnetooptical disk drives MO(1), MO(2), . . . MO(m/s) with the idle playback head. If there is no idle playback head, then information reproduced by the recording and dubbing playback head R is recorded on the magnetooptical disk 40 in another of the magnetooptical disk drives MO(1), MO(2), . . . MO(m/s), and the recorded information is reproduced from the magnetooptical disk 40. If the requested source is not present in the database DB2, but present in the database DB1, then reel ID data and address data read from the database DB1 are supplied to the library 7 to reproduce the requested source information from the library 7. The reproduced information is recorded on and then reproduced from the magnetooptical disk 40 in any of the magnetooptical disk drives MO(1), MO(2), . . . MO(m/s). If the requested source is not present in the databases DB1, DB2, then character data indicative of the absence of the requested source are generated by the character generator 14b. Therefore, the source information can be delivered on a real-time basis to the subscriber's residences 11-1–11-n which have made the source requests. In the absence of the requested source information, a message representing the unavailability of the requested source information is sent to the subscriber's residences 11-1–11-n, indicating the unavailability of the requested source information to the users. Consequently, various items of information can be given to a number of users through a relatively simple arrangement in a relatively simple process. Sources can be supplied to many subscriber's residences 11-1–11-n while minimizing the number of magnetooptical disk drives MO(1), MO(2), . . . MO(m/s) and the number of identical programs available.

In the above embodiment, a desired program can be requested by a demand control signal transmitted from a commander or the like in a subscriber's residence. However, signals for starting, stopping, fast-feeding, rewinding, and pausing a magnetooptical disk may be transmitted to each of the magnetooptical disk drives MO(1), MO(2), . . . MO(m/s) by a commander or the like. According to such a modification, the playback heads P1–Ps of each of the magnetooptical disk drives MO(1), MO(2), . . . MO(m/s) can be assigned fully to and independently operable by each of the requests from the subscribers, and controlled by the control computer 14 so that they can start, stop, fast-feed, rewind, and pause the magnetooptical disk in response to the requests from the subscribers.

In this embodiment, therefore, since there are "m/s" magnetooptical disk drives MO(1), MO(2), . . . MO(m/s) connected in series, even when there are simultaneous requests at any time for "m" identical programs, the programs can reliably be played back and supplied to the requesting subscribers.

In the event of a failure of a magnetooptical disk drive MO(q) (q ranges from 1 to m/s), the malfunctioning magnetooptical disk drives MO(q) can be bypassed by the bypass without adversely affecting the operation of the VOD delivery system in its entirety.

The bypass allows a magnetooptical disk drive MO(q) (q ranges from 1 to m/s) to supply another program, making the VOD delivery system meet various requests from subscribers.

Since the recording mediums of the copier memory 8 comprise magnetooptical disks 40, reproduced signals can be outputted by high-speed and direct access.

A predetermined amount of reproduced information is supplied to subscribers depending on the transfer rate of information at the time it is recorded on a magnetooptical disk 40 and the output rate of information supplied from the buffers B1–Bs. Therefore, the predetermined amount of reproduced information from the playback heads P1–Ps is stored in the buffers B1–Bs, and the information stored in the buffers B1–Bs can be selected and outputted at a rate corresponding to external access timing.

Each of the recording and playback devices can at least start, stop, fast-feed, rewind, and pause a recording medium in response to an external access. Thus, the recording and playback devices can be controlled depending on an external request.

While the copier memory 8 comprises magnetooptical disk drives in the above embodiment, it may comprise optical disk drives which employ optical disks as phase-change mediums, silicon disk drives, or hard disk drives. Where silicon disk drives are employed, information access can be achieved at a highest speed, and required hardware can be minimized. Where hard disk drives are employed, they allow hard disks to be accessed faster than the magnetooptical disk drives and the optical disk drives though the access speed is lower than the silicon disk drives.

2nd Embodiment

In the first embodiment, if any of the magnetooptical disk drives MO(1), MO(2), . . . MO(m/s) which has a magnetooptical disk 40 where a request source is recorded has no idle playback head, then a source reproduced by the recording and dubbing playback head R from the magnetooptical disk drive with no idle playback head is supplied to any of the magnetooptical disk drives MO(1), MO(2), . . . MO(m/s) which is to be used, and recorded on the magnetooptical disk 40 set therein. Thereafter, the recorded source is reproduced from the magnetooptical disk 40. According to a second embodiment, however, if any of the magnetooptical disk drives MO(1), MO(2), . . . MO(m/s) which has a magnetooptical disk 40 where a request source is recorded has no idle playback head, then the same source recorded in any of the tape cassettes T1–Tp of the library 7 is reproduced by one of the VTRs V1–Vm, and the source information reproduced from the library 7 by the VTR is supplied to any of the magnetooptical disk drives MO(1), MO(2), . . . MO(m/s) which is to be used, and recorded on the magnetooptical disk 40 set therein. Thereafter, the recorded source is reproduced from the magnetooptical disk 40. In this arrangement, because the recording and dubbing playback head R can be used as a recording head in those magnetooptical disk drives MO(1), MO(2), . . . MO(m/s) with no idle playback head, information can be recorded on the magnetooptical disk 40 in the those magnetooptical disk drives MO(1), MO(2), . . . MO(m/s) with no idle playback head. Accordingly, the cost of the VOD delivery system may be reduced.

3rd Embodiment

In the first embodiment, if any of the magnetooptical disk drives MO(1), MO(2), . . . MO(m/s) which has a magnetooptical disk 40 where a request source is recorded has no idle playback head, then a source reproduced by the recording and dubbing playback head R from the magnetooptical disk drive with no idle playback head is supplied to any of the magnetooptical disk drives MO(1), MO(2), . . . MO(m/s) which is to be used, and recorded on the magnetooptical disk 40 set therein. Thereafter, the recorded source is reproduced from the magnetooptical disk 40. According to a third embodiment, however, the recording and dubbing playback head R is used only as a recording head, and an emergency or dubbing playback head Ps+1 (shown by the broken line in FIG. 5) is employed in addition to the playback heads P1–Ps and the recording head. If any of the magnetooptical disk drives MO(1), MO(2), . . . MO(m/s) which has a magnetooptical disk 40 where a request source is recorded has no idle playback head, then a requested source if reproduced by the dubbing playback head Ps+1, and the source information reproduced by the dubbing playback head Ps+1 is supplied to any of the magnetooptical disk drives MO(1), MO(2), . . . MO(m/s) which is to be used, and recorded on the magnetooptical disk 40 set therein. Thereafter, the recorded source is reproduced from the magnetooptical disk 40. In this arrangement, information can be recorded on the magnetooptical disk 40 in the those magnetooptical disk drives MO(1), MO(2), . . . MO(m/s) with no idle playback head. Accordingly, the cost of the VOD delivery system may be reduced.

4th Embodiment

Figure 13:
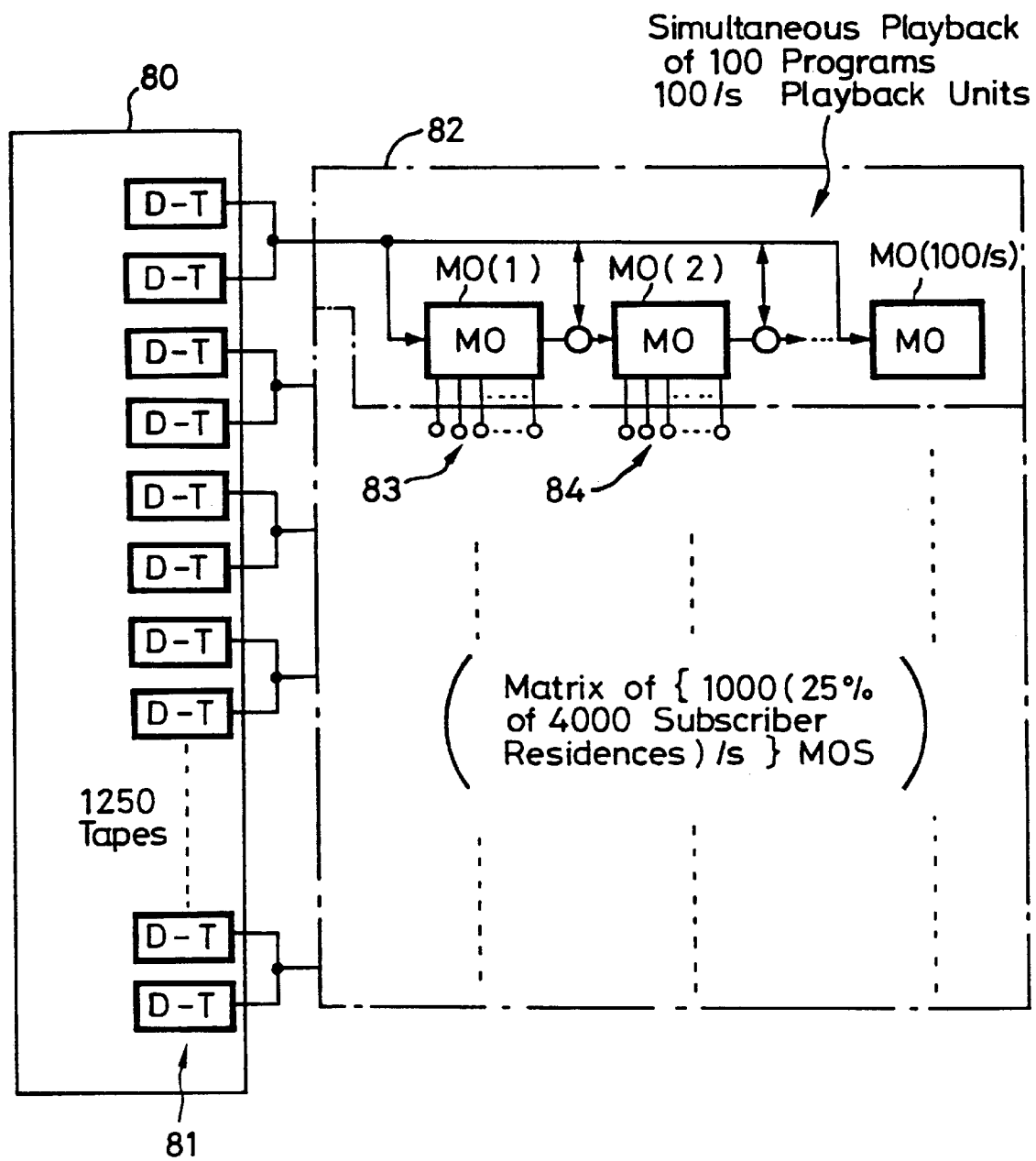
FIG. 13 is a block diagram of an information transmission system according to another embodiment, showing a library and a copier memory in a playback process based on 1000 requests from subscribers.

FIG. 13 shows a VOD delivery system which incorporates an information transmission system according to a fourth embodiment of the present invention. If there are requests at a peak from 25% of 4000 subscriber's residences, and 100 programs of those requests are the same software, then a library 80 has 1250 tape cassettes (D-T) 81, and a copier memory 82 has "100/s" magnetooptical disk drives MO(1), MO(2), . . . MO(100/s) connected in series, where "s" is the number of output terminals 83, 84 of the magnetooptical disk drives MO(1), MO(2). The VOD delivery system shown in FIG. 13 allows 100 identical software materials, e.g., movie programs, to be reproduced simultaneously at any desired time.

The copier memory 82 also has a matrix of "1000/s" magnetooptical disk drives for supplying software materials in response to 1000 requests from 1000 subscriber's residences which are 25% at a peak of 4000 subscriber's residences.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An information on demand system, comprising:
a library comprising a plurality of first recording media and a plurality of first playback means for reproducing a first plurality of program data signals stored on said plurality of first recording media;
memory means, coupled to said library, for storing the program data signals reproduced from said library, said memory means comprising:
a plurality of second recording media;
recording means for recording the program data signals reproduced from said library to at least one of said plurality of second recording media; and
a plurality of second playback means for reproducing a second plurality of program data signals from said plurality of second recording media;
control means for controlling said library and for controlling said memory means to transmit said second plurality of program data signals as a function of an access timing, said control means comprising:
reception means for receiving information indicative of a program requested for playback;
database means for determining whether the requested program is recorded on at least one of said plurality of second recording media; and
search and playback control means for searching for an idle second playback means operable with the second recording medium having the requested program recorded thereon, and for reproducing the requested program with said idle second playback means; and
dubbing means for dubbing the requested program onto another of said plurality of second recording media if said second recording medium having the requested program thereon has no idle second playback means operable therewith.

2. The system according to claim 1, wherein each of said plurality of second recording media comprises a disk.

3. The system according to claim 1, wherein at least one of said plurality of second playback means is operable for dubbing information recorded on one of said plurality of second recording media onto another of said plurality of second recording media.

4. The system according to claim 1, wherein said control means further comprises:
playback control means for controlling said plurality of second playback means to reproduce the requested program if the requested program is determined to be recorded on at least one of said plurality of second recording media.

5. The system according to claim 4, wherein said database means stores database information comprising at least identification information, address information and data length information relative to programs recorded on said plurality of second recording media, and identification information relative to said recording means and to said plurality of second playback means.

6. The system according to claim 1, wherein said control means further comprises:
   means for determining whether the requested program is stored in said memory means or in said library; and
   recording and playback control means for controlling said plurality of first playback means to reproduce the requested program from at least one of said plurality of first recording media storing the requested program and for controlling said recording means to record the requested program on at least one of said plurality of second recording media when the requested program is determined to be stored in said library and not in said memory.

7. The system according to claim 6, wherein said database means stores first database information comprising at least identification information and address information relative to programs recorded on said plurality of first recording media, and identification information relative to said plurality of first recording media, and second database information comprising at least identification information, address information and data length information relative to said programs recorded on at least one of said plurality of second recording media, and identification information relative to said recording means and to said plurality of second playback means.

8. The system according to claim 1, wherein said control means further comprises:
   means for determining whether the requested program is stored in said memory means or in said library; and
   message information generating means for generating message information if the requested program is not stored in said memory means or in said library.

9. The system according to claim 8, wherein said database means contains first database information comprising at least identification information and address information relative to programs recorded on said plurality of first recording media, and identification information relative to said plurality of first recording media, and said second database information comprising at least identification information, address information and data length information relative to said programs recorded on said plurality of second recording media, and identification information relative to said recording means and to said second playback means.

10. An information on demand system, comprising:
    a library comprising a plurality of first recording media and a plurality of first playback means for reproducing a first plurality of program data signals stored on said plurality of first recording media;
    memory means, coupled to said library, for storing the program data signals reproduced from said library, said memory means comprising:
       a plurality of second recording media;
       recording means for recording the program data signals reproduced from said library to at least one of said plurality of second recording media;
       a plurality of second playback means for reproducing a second plurality of program data signals from said plurality of second recording media; and
       a plurality of buffers for storing the reproduced second plurality of program data signals, wherein each of said plurality of second playback means corresponds to a respective one of said plurality of buffers; and
    control means for controlling said library and said memory means to transmit said second plurality of program data signals as a function of an access timing, said control means comprising:
       reception means for receiving information indicative of a program requested for playback;
       database means for determining whether the requested program is recorded on at least one of said plurality of second recording media; and
       dubbing control means for determining whether a second recording medium determined to have the requested program stored thereon is operable with an idle second playback means, and for dubbing the program recorded on the determined second recording medium onto another of said plurality of second recording media if the determined second recording medium does not have said idle second playback means operable therewith.

11. The system according to claim 10, wherein said database means stores database information comprising at least identification information, address information and data length information relative to the programs recorded on said plurality of second recording media, and identification information relative to said recording means and to said plurality of second playback means.

12. A method for processing information on demand, comprising the steps of:
    storing program data on one of a plurality of first recording media in a library that includes a plurality of first playback means for reproducing said program data;
    recording the program data received from said library onto at least one of a plurality of second recording media located in a memory which is coupled to said library, said memory including a plurality of second playback means for reproducing the program data from said plurality of second recording media, said memory further including a plurality of buffers for storing the reproduced program data, wherein each of said plurality of second playback means corresponds to a respective one of said plurality of buffers;
    receiving information indicative of a request for playback of a program;
    determining whether the requested program is recorded on at least one of said plurality of second recording media;
    searching for an idle second playback means operable with the second recording medium having the requested program recorded thereon;
    reproducing the requested program with said idle second playback means; and
    dubbing the requested program onto another of said plurality of second recording media if said second recording medium having the requested program thereon does not have said idle second playback means operable therewith.

13. An information on demand transmission method, comprising the steps of:
    storing a first plurality of program data signals on a plurality of first recording media in a library;
    receiving a request for playback of a program;
    checking whether the requested program is stored on one of a plurality of second recording media in a memory coupled to said library, said memory including a plurality of playback means for reproducing a second plurality of program data signals from said plurality of second recording media, said memory means further including a plurality of buffers for storing the reproduced second plurality of program data signals, wherein each of said plurality of playback means corresponds to a respective one of said plurality of buffers;

determining whether a second recording medium determined to have the requested program stored thereon is operable with an idle playback means;

dubbing the requested program selectively stored on one of said plurality of first or second recording media onto another of said plurality of second recording media having said idle playback means operable therewith if the determined second recording medium does not have said idle playback means operable therewith or if the requested program is not stored on the determined second recording medium; and controlling an output of the requested program from said another of said plurality of second recording media in response to an access timing.

14. The method according to claim 13, further comprising reproducing the requested program from the determined second recording medium to one of said plurality of buffers at a first rate and then outputting the requested program from said one of said plurality of buffers at a second rate lower than said first rate.

15. The method according to claim 13, further comprising the steps of:

detecting whether the requested program is stored on one of said plurality of first recording media; and generating and outputting character information if the requested program is not stored in said memory or said library.

16. An information on demand transmission apparatus, comprising:

a library including a plurality of first recording media for storing a first plurality of program data signals, and including a plurality of first playback means for reproducing said first plurality of program data signals;

means for receiving a request for playback of a program;

memory means including a plurality of second recording media for storing said first plurality of program data signals, said memory means including a plurality of second playback means for reproducing a second plurality of program data signals from said plurality of second recording media, said memory means further including a plurality of buffers for storing the reproduced second plurality of program data signals, wherein each of said plurality of second playback means corresponds to a respective one of said plurality of buffers;

control means for controlling a playback of the requested program in response to an access timing, said control means including means for checking whether the requested program is stored on one of said plurality of second recording media and means for determining whether a second recording medium determined to have the requested program stored thereon is operable with an idle second playback means;

means for dubbing the requested program selectively stored on one of said plurality of first or second recording media onto another of said plurality of second recording media having said idle second playback means operable therewith if the determined second recording medium does not have said idle second playback means operable therewith or if the requested program is not stored on the determined second recording medium; and output means for outputting the requested program from said another of said plurality of second recording media based on a signal from said control means.

17. The apparatus according to claim 16, further comprising means for reproducing the requested program from the determined second recording medium to one of said plurality of buffers at a first rate and means for outputting the requested program from said one of said plurality of buffers at a second rate lower than said first rate.

18. The apparatus according to claim 16, wherein said control means further includes means for detecting whether the requested program is stored in said library, and further comprising means for generating and outputting character information if the requested program is not stored in said memory means or said library.

* * * * *